No. 669,739. Patented Mar. 12, 1901.
J. C. ANDERSON.
TIRE.
(Application filed Oct. 16, 1900.)
(No Model.)
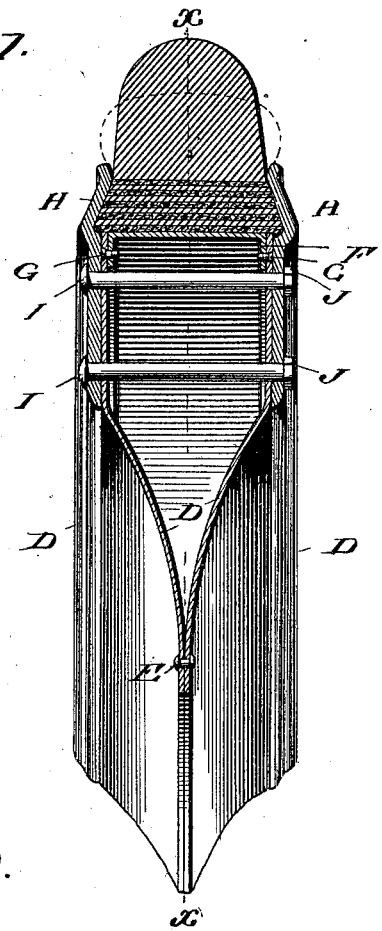
Fig. 1.
Fig. 2.
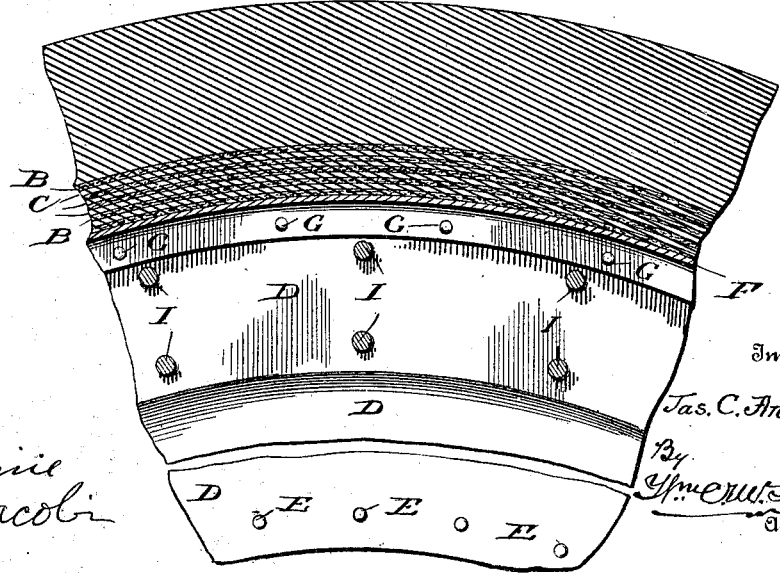
Witnesses
Inventor
Jas. C. Anderson
By
Attorney

UNITED STATES PATENT OFFICE.

JAMES C. ANDERSON, OF HIGHLAND PARK, ILLINOIS.

TIRE.

SPECIFICATION forming part of Letters Patent No. 669,739, dated March 12, 1901.

Application filed October 16, 1900. Serial No. 33,249. (No model.)

*To all whom it may concern:*

Be it known that I, JAMES C. ANDERSON, a citizen of the United States, residing at Highland Park, in the county of Lake and State of Illinois, have invented certain new and useful Improvements in Tires; and I do hereby declare the following to be a full, clear, and exact description of the invention, such as will enable others skilled in the art to which it appertains to make and use the same.

My invention relates to certain new and useful improvements in tires for wheels and means for securing them in position.

While my invention may be used generally, it is especially adapted to automobiles and other similar vehicles in which the power is applied directly to the wheel and in which case perfect traction is a necessity.

In most vehicles propelled by self-contained power the combined weight of the vehicle and motive power is of such proportions that the tires of the wheels are subjected to great strain, and as a result the tendency to "creep" within the rim or felly and to ride off the same and also to rapid wear and destruction renders the use of rubber tires almost prohibitive, although, as heretofore stated, such tires are not only desirable, but almost a necessity, in order that the proper degree of traction may be obtained.

In the use of solid-rubber tires the most efficient and most common manner of securing them in position upon the rim of the wheel is by the use of circumferential wires threaded through circumferential channels in the body of the tire. In order that said wires may have their ends properly joined, the tire is of necessity formed with two ends adapted to abut and to conceal the joints of the wires when the ends have been properly interlocked, and hence the tire is made of a circumference somewhat greater than that of the rim of the wheel, and after the binding-wires are properly located the ends of the tire are forced apart while the ends of the wire are being joined, and when this is accomplished the ends of the tire are forced together by the expansive action of the material composing the same. In such tires the "creeping" action causes it to not only travel upon the rim of wheel, but also to move upon the securing-wires, and consequently the body of the tire is worn away on its inner circumference and also at those points surrounding the wires, and hence the wires become inefficient as a means of holding the tire in its place, and its integrity is soon destroyed and it is liable to climb off the rim of the wheel.

My invention has for its object to so construct and secure in position rubber tires as to overcome the disadvantages enumerated and to provide a tire the body of which shall be continuous or unbroken and homogeneous throughout its entire extent.

With these ends in view my invention consists, generically, of a rubber or elastic tire having its inner circumference, or that portion which is designed to be in intimate contact with the rim or felly of the wheel, non-elastic circumferentially, while that portion projecting beyond the rim shall have the necessary degree of elasticity to secure proper traction.

My invention also has for its object to provide the necessary means for securing a continuous and homogeneous tire such as described in proper and immovable position upon the wheel; and with these ends in view my invention consists of a continuous tire composed of rubber or similar material and having incorporated therein and vulcanized therewith at its inner circumference or base layers or laminæ of canvas or similar non-stretchable material separated and cemented together by an interposed strata of rubber, as will be hereinafter more fully described.

My invention consists, further, in the details of construction by which the continuous tire may be rigidly secured in position and removed when necessary, as will be hereinafter explained.

In order that those skilled in the art may fully understand my invention and know how to make and use the same, I will proceed to describe the construction of my improved tire, referring by letters to the accompanying drawings, in which—

Figure 1 represents in cross-section my improved tire secured in position upon the rim of a wheel, and Fig. 2 a transverse section taken at the line $x\,x$ of Fig. 1.

Similar letters of reference denote like parts in both figures of the drawings.

A represents the tire, the base of which has incorporated with it a coil or series of strips B of canvas or other non-stretchable flexible material, while that portion of the tire projecting beyond the rim of the wheel is devoid of such incorporated strips and is sufficiently elastic to assume under the weight carried the position shown in dotted lines to give the proper degree of traction. The laminæ of canvas or other material A, whether composed of coils or a series of strips, are slightly separated by interposed stratas of rubber C, all vulcanized together and integral with the remainder of the tire.

The "tread" of the tire is of the usual semicircular form in cross-section, and the sides are slightly flared, as clearly shown at Fig. 1, for the purpose presently explained. From the construction described it will be seen that while the laminæ of rubber between the coils or strips of canvas permit of a certain degree of compression of the tire the presence of the canvas coil or strips will prevent any circumferential stretching of the tire, and hence its relation with the felly or support will remain unchangeable.

The wheel which I have designed especially for use with the improved tire is composed of a web consisting of sheet-metal disks concaved and riveted at E and separated and braced at their outer edges by an annular bridge or felly F, secured in position by metal screws G.

Ring-flanges H are secured to the disks D by screw-bolts I and nuts J. That portion of the ring-flanges H projecting beyond the felly F is bent outwardly in the plane coincident with the periphery of the felly, thence inwardly to correspond with the outward flare of the tire, and thence outwardly, as clearly shown in Fig. 1. This construction permits the ring-flanges to tightly grasp and hold the flared portion of the base of the tire and at the same time permits the lateral movement of the elastic tread portion, as illustrated by the dotted line in Fig. 1.

The proportions and relation of the tire and ring-flanges are such that the application of the bolts I and nuts J will cause the base of the tire to be tightly clamped between the flared edges of the ring-flanges H and prevent any tendency of creeping of the tire, while at the same time the presence of the stratas C of rubber between the coils or strips B of canvas under vertical compression will move laterally against the inner surfaces of the ring-flanges and aid in establishing fixed circumferential relation between the tire and the ring-flanges.

The vulcanization of the tire may, if desired, be carried to a greater extent at the base, where the canvas is incorporated, than at the projecting or tread portion, or the entire body may be vulcanized to the same degree.

From what has been stated it will be seen that my improved tire is made with a continuous and unbroken tread-surface and that it is made of substantially the same diameter interiorly as that of the rim or felly F, so that it may be readily placed thereon by simply removing one of the ring-flanges H and then replacing said ring-flange and securing it in position in the manner hereinbefore described.

While I prefer to form the tire with the sides flared outwardly toward the base and to secure the same upon the felly of a wheel by means of ring-flanges, as stated, it will be understood that I do not wish to be limited by these particulars, as the tire may be of any other form in cross-section and secured in place upon the rim of a wheel in any other manner without departing from my invention, the generic feature of which consists of a continuous tire composed of rubber or its equivalent, with circumferentially-disposed coils or strips of non-stretchable flexible material incorporated in the base portion of the tire, whereby circumferential stretching of the base is prevented.

What I claim as new, and desire to secure by Letters Patent, is—

1. A continuous homogeneous elastic tire for wheels, composed of rubber or equivalent material having incorporated within its base portion a series of continuous, circumferentially-disposed coils or strips of non-stretchable fabric having continuous curved paths and with a strata of rubber between each strip or coil, whereby the tire is prevented from elongating circumferentially as hereinbefore set forth.

2. A continuous homogeneous tire composed of rubber or equivalent material, having incorporated within its base portion a series of circumferentially-disposed coils or strips of non-stretchable fabric, with a strata of rubber between the strips or coils, and the sides of the tire flared outwardly near, and to the base, and adapted to be secured in position upon the rim of a wheel by correspondingly-flared ring-flanges and held against "creeping" by the lateral movement of the rubber stratas between the strips or coils, substantially as set forth.

In testimony whereof I affix my signature in presence of two witnesses.

JAMES C. ANDERSON.

Witnesses:
WM. C. MCINTIRE,
D. G. STUART.